US012011928B2

(12) United States Patent
Graham et al.

(10) Patent No.: US 12,011,928 B2
(45) Date of Patent: Jun. 18, 2024

(54) SELF-CLEANING NOZZLE PLATE

(71) Applicant: FUNAI ELECTRIC CO., LTD, Osaka (JP)

(72) Inventors: David C. Graham, Lexington, KY (US); Sean T. Weaver, Lexington, KY (US)

(73) Assignee: Funai Electric Co., Ltd. (JP)

( * ) Notice: Subject to any disclaimer, the term of this patent is extended or adjusted under 35 U.S.C. 154(b) by 147 days.

(21) Appl. No.: 17/662,873

(22) Filed: May 11, 2022

(65) Prior Publication Data

US 2023/0364911 A1 Nov. 16, 2023

(51) Int. Cl.

*B41J 2/16* (2006.01)
*B41J 2/14* (2006.01)
*B41J 2/165* (2006.01)

(52) U.S. Cl.

CPC ......... *B41J 2/16517* (2013.01); *B41J 2/1433* (2013.01); *B41J 2/162* (2013.01); *B41J 2/1631* (2013.01)

(58) Field of Classification Search

CPC ...... B41J 2/16517; B41J 2/1433; B41J 2/162; B41J 2/1631; B41J 2002/14411

See application file for complete search history.

(56) References Cited

U.S. PATENT DOCUMENTS 6,132,028 A * 10/2000 Su ........................ B41J 2/16535 347/47
6,270,191 B1 * 8/2001 Morikoshi ............. B41J 2/1433 347/45
7,341,333 B2 3/2008 Sugahara
7,442,317 B2 10/2008 Silverbrook
7,484,829 B2 2/2009 Sugahara
8,394,281 B2 3/2013 Sim et al.
8,591,005 B2 11/2013 Nakamoto et al.
2004/0174411 A1 9/2004 Sumiya et al.
2006/0023035 A1 * 2/2006 Sugahara ............... B41J 2/2121 347/74
2009/0147049 A1 6/2009 Lee et al.
2022/0105724 A1 * 4/2022 Weaver .................. B41J 2/1645

FOREIGN PATENT DOCUMENTS

JP h0999558 B 12/2002

* cited by examiner

*Primary Examiner* — Jason S Uhlenhake
(74) *Attorney, Agent, or Firm* — Luedeka Neely, P.C.

(57) ABSTRACT

A nozzle plate of a fluid ejection head for a fluid ejection device, a fluid ejection head containing the nozzle plate, and a method for making the fluid ejection head containing the nozzle plate. The nozzle plate includes an array of nozzle holes and a fluid channel layer attached to an exposed surface of the nozzle plate, wherein the fluid channel layer comprises a fluid channel formed in the fluid channel layer adjacent to each nozzle hole for urging fluid from each nozzle hole.

11 Claims, 5 Drawing Sheets

SELF-CLEANING NOZZLE PLATE

TECHNICAL FIELD

The disclosure is directed to an improved photoimageable nozzle member for fluid ejection devices and methods and structures that provide self-cleaning of the ejection head nozzle members during continuous use thereof.

BACKGROUND AND SUMMARY

Fluid jet ejection heads for conventional fluid jet ejection devices require periodic cleaning due to the presence of excess fluid on nozzle plates of fluid jet ejection heads. If the fluid ejection heads are not cleaned periodically, a buildup of fluid such as dried ink will cause a deterioration of fluid jetting from nozzle holes in the fluid jet ejection heads. Fluid buildup, such as ink, is particularly troublesome for printing devices used for printing on packing such as cardboard or other items moving along a conveyor. While personal ink jet printing devices are provided with a housing and an ejection head cleaning station therein, industrial printers used in packaging operations typically have elongate stationary ejection heads and do not have cleaning stations for the ejection heads. Accordingly, the buildup of ink on the nozzle plate of such printing devices can block or reduce the size of one or more nozzles of the nozzle plate and/or cause mis-direction of fluid ejected droplets.

As shown in FIGS. 1 and 2, a conventional ejection head 10 has a plurality of nozzle holes 12*a* and 12*b* that are closely adjacent to one another. During a printing operation, fluid is fed from a fluid via 14 etched through an ejection head chip 16 to one or more flow channels 18 and associated fluid chambers 20 in a fluid flow layer 22 of the ejection head 10. A fluid ejector 24, such as a thin film resistor, may be used to heat fluid in the fluid chambers 20 and thereby cause fluid to be ejected through the nozzle holes 12 in a nozzle plate 26. FIG. 2 shows two arrays 28*a* and 28*b* of nozzle holes 12 and fluid ejectors 24. During fluid ejection, there is a tendency of fluid to be built up on the surface 30 of the nozzle plate 26 adjacent to the nozzle holes 12. Fluid can build up on the surface 30 of the nozzle plate 26 adjacent to the nozzle holes 12*a* and 12*b* and dry or otherwise interfere with fluid being ejected from the nozzle holes 12. Hence, there is a need to clean the nozzle plate 26 periodically to remove dried and excess fluid from the surface 30 of the nozzle plate 26. However, industrial printers as described above do not have maintenance stations or other means for cleaning the nozzle plate. Typically, the substrate to be printed passes under or adjacent to a stationary fluid ejection head 10. There is no mechanism to move the ejection head 10 to a maintenance station for cleaning or wiping the nozzle plate 26. Accordingly, what is needed is a self-cleaning nozzle plate that reduces the buildup of fluids such as inks adjacent to nozzle holes in the nozzle plate.

In view of the foregoing, an embodiment of the disclosure provides a nozzle plate of a fluid ejection head for a fluid ejection device. The nozzle plate includes two or more arrays of nozzle holes and a fluid channel layer attached to an exposed surface of the nozzle plate. The fluid channel layer includes a fluid channel formed in the fluid channel layer adjacent to each nozzle hole for urging fluid from each nozzle hole.

Another embodiment of the disclosure provides a method for making an improved fluid ejection head for fluid ejection device. The method includes applying a first negative photoresist layer to a device surface of a semiconductor substrate. The first negative photoresist layer is derived from a composition that includes a multi-functional epoxy compound, a first di-functional epoxy compound, a photoacid generator, an adhesion enhancer, and an aryl ketone solvent. The first photoresist layer is imaged and developed to provide a plurality of flow features therein. A second negative photoresist layer is applied to an exposed surface of the first photoresist layer. The second negative photoresist layer has a thickness ranging from about 10 to about 30 microns and is derived from a second photoresist formulation comprising a second di-functional epoxy compound, a relatively high molecular weight polyhydroxy ether, the photoacid generator, the adhesion enhancer, and an aliphatic ketone solvent. The second photoresist layer is imaged and developed to provide a nozzle plate having a plurality of nozzle holes therein. A third negative photoresist layer is applied to an exposed surface of the nozzle plate. The third negative photoresist layer is imaged and developed to provide a fluid channel therein adjacent to each nozzle hole for urging fluid from each nozzle hole.

In some embodiments, the nozzle plate is made of a photoimageable layer.

In some embodiments, each nozzle hole further includes a recessed area in the third negative photoresist layer that circumscribes each nozzle hole. In other embodiments, the recessed area in the third negative photoresist layer that circumscribes each nozzle hole and is in fluid flow communication with the fluid channel adjacent to each nozzle hole.

In some embodiments, each nozzle hole further includes a rectangular recessed area in the third photoresist layer that is disposed over each fluid chamber for each nozzle hole. In other embodiments, the rectangular recessed area is in fluid flow communication with the fluid channel adjacent to each nozzle hole.

In some embodiments, the fluid channel has a size that promotes capillary action to wick fluid away from each nozzle hole toward the non-functional area of the nozzle plate.

An advantage of the nozzle plate structures and methods described herein is that fluid buildup adjacent the nozzle holes of a nozzle plate is greatly reduced, if not substantially eliminated. The fluid is drawn away from the nozzle holes through the fluid channels to non-functional areas of the nozzle plate. By "non-functional areas" means areas that do not interfere with fluid being ejected through the nozzle holes during a fluid ejection or printing operation. Such areas may include any areas that are more than an ejector size distance away from the nozzle holes toward distal ends of the fluid channels. Accordingly, the embodiments provide a structure and method that allows fluid ejection without the need to remove excess fluid from the nozzle plate by wiping or other maintenance operations.

DETAILED DESCRIPTION OF EXEMPLARY EMBODIMENTS

The disclosure is directed to improved nozzle plates for fluid ejection heads for fluid dispense devices, particularly printers. For some applications, the printers have a series of stationary fluid ejection heads disposed side-by-side in a linear elongate array to print on a substrate such as packaging moving along a conveyor.

Figure 3:
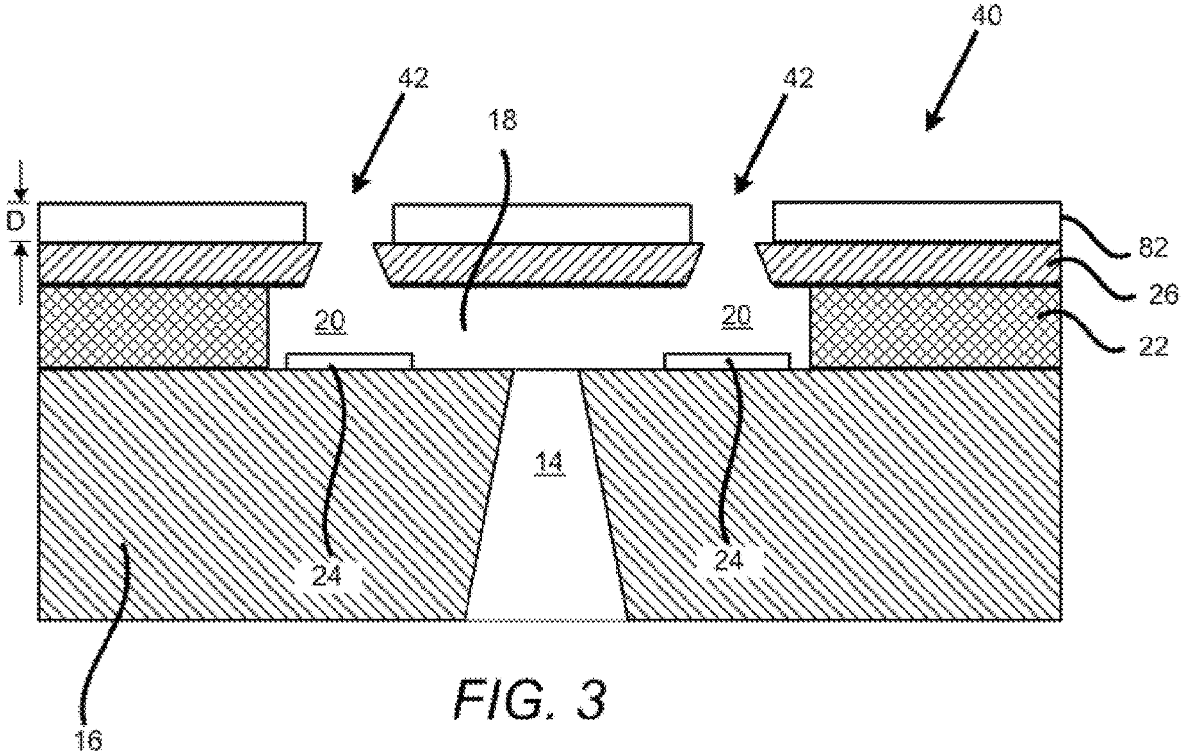
FIG. 3 is a cross-section view, not to scale, of a portion of the fluid ejection head of according to an embodiment of the disclosure.
Figure 4:
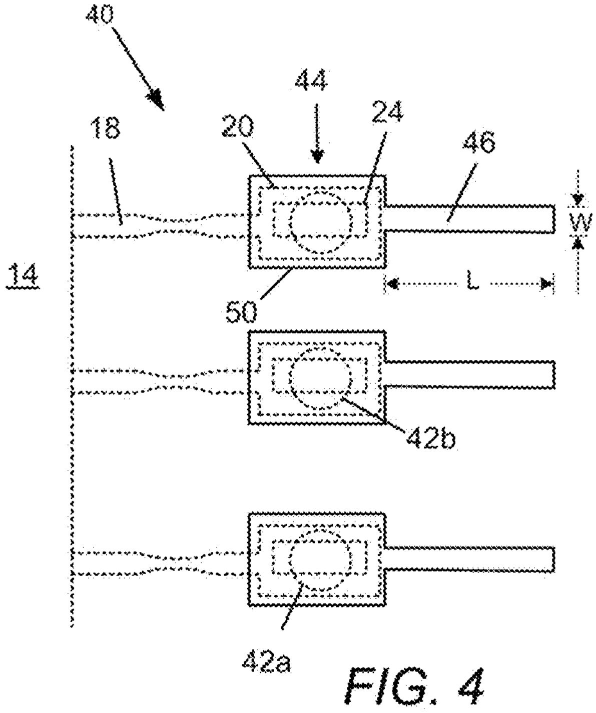
FIG. 4 is a plan schematic view, not to scale, of the portion of the fluid ejection heads of FIG. 3 containing fluid channels and troughs in a layer attached to a nozzle plate of the fluid ejection head for urging fluid away from nozzle holes.

A portion of the fluid ejection head 40 according to the disclosure is illustrated in a cross-sectional view in FIG. 3 and in a plan view in FIG. 4. The fluid ejection head 40 includes a plurality of fluid ejection nozzles 42*a* and 42*b* disposed along a linear array 44 thereof. Fluid is provided to fluid ejectors 24, such as resistor heaters, from a fluid supply via 14 etched in a semiconductor substrate 16 for providing fluid through flow channels 18 to the fluid ejectors 24 disposed in the fluid chambers 20 as described above.

Figure 1:
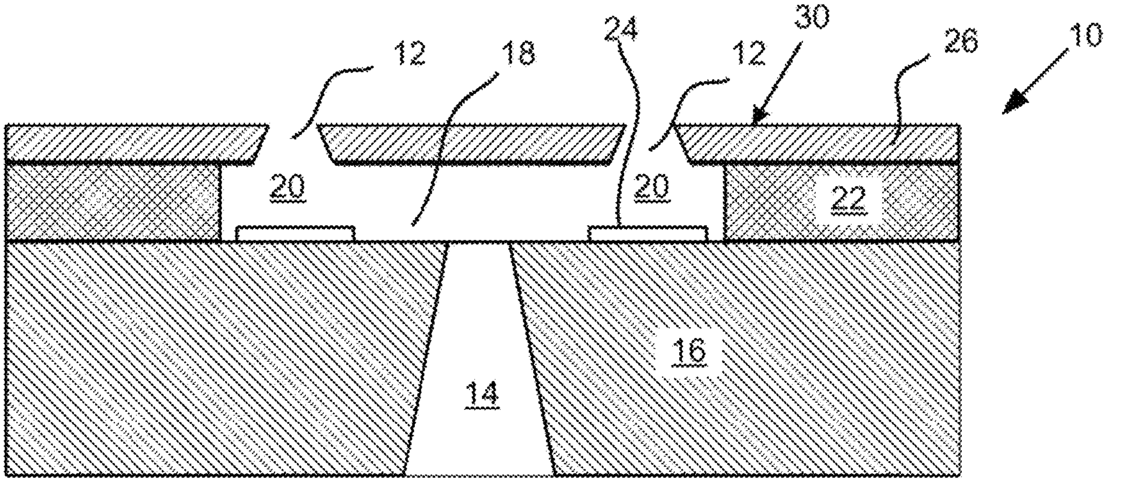
FIG. 1 PRIOR ART
FIG. 1 is a cross-sectional view, not to scale, of a portion of a prior art fluid ejection head.
Figure 2:
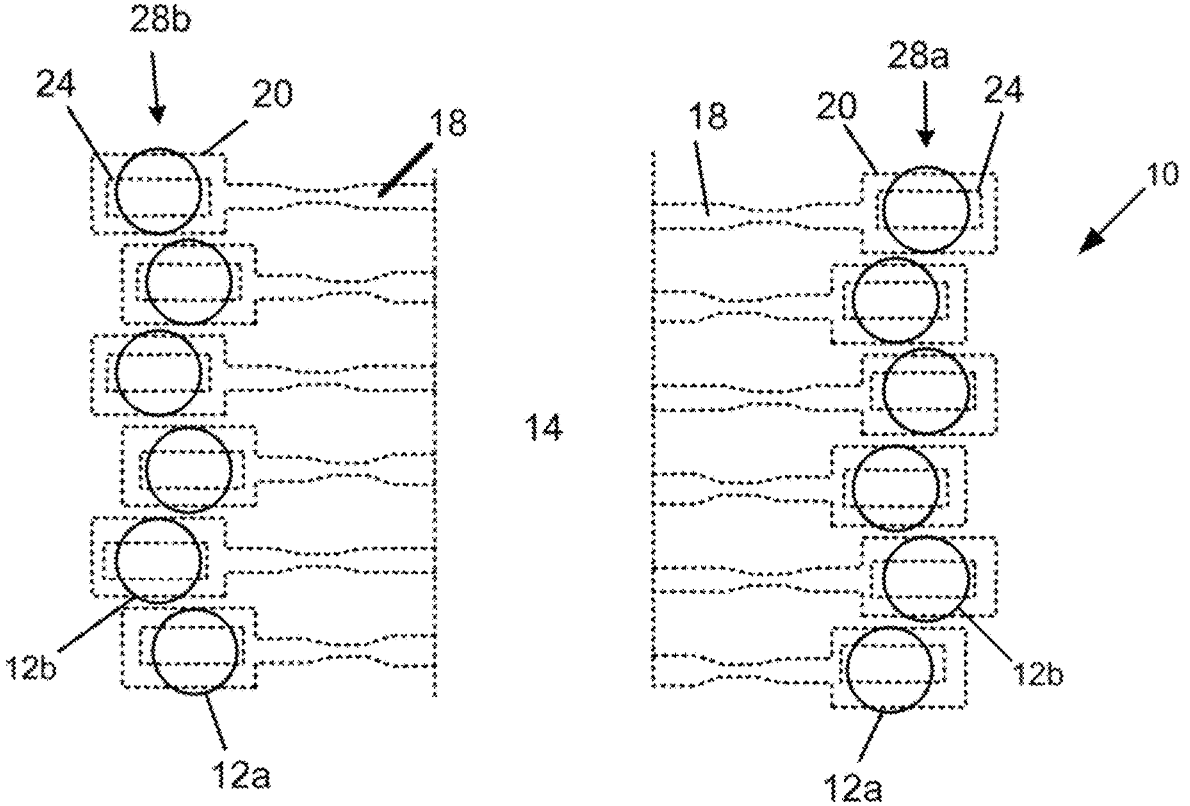
FIG. 2 PRIOR ART
FIG. 2 is a plan schematic view, not to scale, of the portion of the prior art fluid ejection head of FIG. 1.
Figure 5:
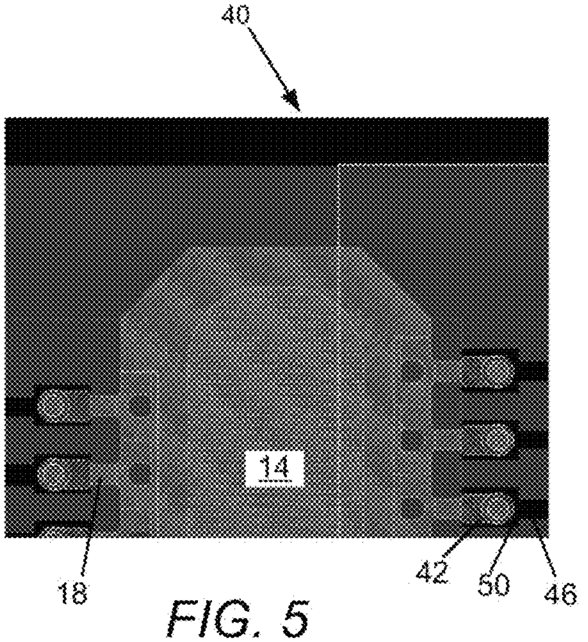
FIGS. 5-7 are plan view photomicrographs of ejection head according to embodiments of the disclosure.

In order to prevent fluid from building up and drying on the surface 30 of the nozzle plate 26 (FIG. 1), fluid channels 46 are formed in a layer 48 applied to the nozzle plate 26 as shown in FIGS. 3 and 4. The fluid channels 46 have a length (L) and width (W) that is sufficient to cause fluid to be urged away from the nozzle holes 42 by capillary action to a remote portion of the nozzle plate 26 that is non-functional with respect to a printing operation. The non-functional areas are toward the distal end of the fluid channels 46 that are opposite to ends of the fluid channels adjacent to the nozzle holes. The length (L) of the fluid channels 46 may range from about 0.1 micron to about an outside edge of the nozzle plate 26 and the width (W) of the fluid channels 46 may range from about 0.1 micron to about two times a diameter of the fluid ejector 24. The fluid channels 46 may be formed in the layer 48 to a depth (D) ranging from about 0.1 micron to about 100 microns. The depth (D) may be the same as the thickness of layer 48, or may be less than the thickness of layer 48. In some embodiments, rectangular troughs 50 may be formed in the layer 48 to the same depth as the fluid channels 46. The rectangular troughs 50 may surround the nozzle holes 42 so as to allow fluid surrounding the nozzle holes 42 to enter the fluid channels 46 and be drawn away from the nozzle holes 42. A photomicrograph of the ejection head 40 according to FIG. 4 is shown in FIG. 5.

Figure 6:
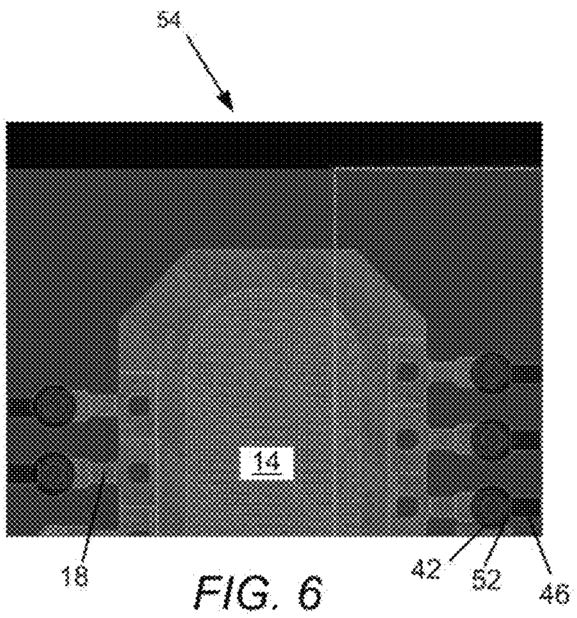

In another embodiment, circular troughs 52 surrounding the nozzle holes 42 may be formed in the layer 48. Like the rectangular troughs 50, the circular troughs are connected to the channels 46 for urging fluids away from the nozzle holes 42. A photomicrograph of an ejection head 54 having the circular troughs 52 connected to the channels 46 is illustrated in FIG. 6.

Figure 7:
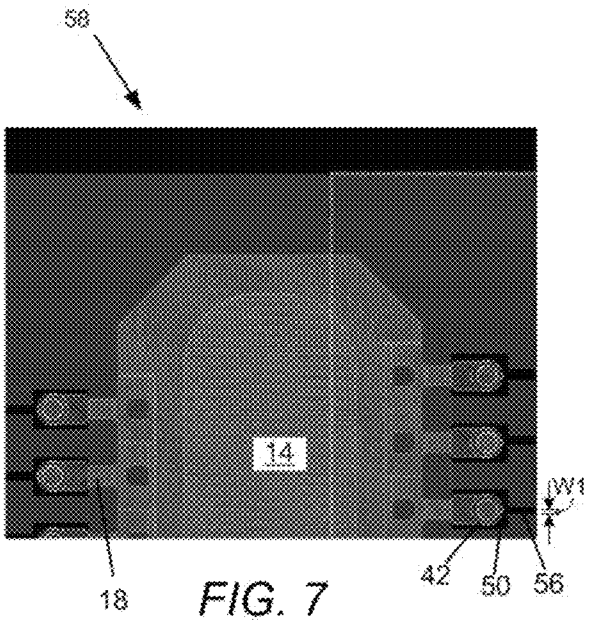

In still other embodiments, channels 56 in the layer 48 having a width (W1) that is less than the width (W) may be used to draw fluid away from the nozzle hole 42 as shown by the photomicrograph of ejection head 58 in FIG. 7.

With reference now to FIGS. 8-12, a method for making an improved ejection head according to embodiments of the disclosure is illustrated. As a first step in the process, a semiconductor substrate 16 containing fluid ejection devices 24 is provided. A first photoresist material layer 60 is applied to a surface 62 of the substrate 16 by conventional methods such as spin coating or laminating the first photoresist material layer 22 to the surface 62 of the substrate 16.

The first photoresist material layer 60 is derived from a first di-functional epoxy compound, a photoacid generator, a non-reactive solvent, and, optionally, an adhesion enhancing agent. In some embodiments of the disclosure, first photoresist material layer 60 includes a multi-functional epoxy compound, a difunctional epoxy compound, a photoacid generator, a non-reactive solvent, and, optionally, an adhesion enhancing agent.

In the photoresist formulations used for making the first photoresist material layer 60, according to embodiments of the disclosure, the difunctional epoxy component may be selected from difunctional epoxy compounds which include diglycidyl ethers of bisphenol-A (e.g. those available under the trade designations “EPON 1007F”, “EPON 1007” and “EPON 1009F”, available from Shell Chemical Company of Houston, Tex., “DER-331”, “DER-332”, and “DER-334”, available from Dow Chemical Company of Midland, Mich., 3,4-epoxycyclohexylmethyl-3,4-epoxycyclo-hexene carboxylate (e.g. “ERL-4221” available from Union Carbide Corporation of Danbury, Connecticut, 3,4-epoxy-6-methylcyclohexylmethyl-3,4-epoxy-6-methylcy-clohexene carboxylate (e.g. “ERL-4201” available from Union Carbide Corporation), bis(3,4-epoxy-6-methylcyclohexylmethyl) adipate (e.g. “ERL-4289” available from Union Carbide Corporation), and bis(2,3-epoxycyclopentyl) ether (e.g. “ERL-0400” available from Union Carbide Corporation.

A particularly suitable difunctional epoxy component is a bisphenol-A/epichlorohydrin epoxy resin available from Shell Chemical Company of Houston, Tex. under the trade name EPON resin 1007F having an epoxide equivalent of greater than about 1000. An “epoxide equivalent” is the number of grams of resin containing 1 gram-equivalent of epoxide. The weight average molecular weight of the difunctional epoxy component is typically above 2500, e.g., from about 2800 to about 3500 weight average molecular weight in Daltons. The amount of difunctional epoxy component in the photoresist formulation may range from about 30 to about 95 percent by weight based on the weight of the cured resin.

The photoresist formulation according to embodiments of the disclosure also include a photoacid generator. The photoacid generator may be selected from a compound or mixture of compounds capable of generating a cation such as an aromatic complex salt which may be selected from onium salts of a Group VA element, onium salts of a Group VIA element, and aromatic halonium salts. Aromatic complex salts, upon being exposed to ultraviolet radiation or electron beam irradiation, are capable of generating acid moieties which initiate reactions with epoxides. The photoacid generator may be present in the photoresist formulation in an amount ranging from about 0.5 to about 15 weight percent based on the weight of the cured resin.

Examples of triaryl-substituted sulfonium complex salt photoinitiators which may be used in the formulations according to an embodiment of the disclosure include, but are not limited to:

triphenylsulfonium tetrafluoroborate
triphenylsulfonium hexafluorophosphate
triphenylsulfonium hexafluoroantimonate
tritolysulfonium hexafluorophosphate
anisyldiphenylsulfonium hexafluoroantimonate
4-butoxyphenyidiphenylsulfonium tetrafluoroborate
4-chlorophenyidiphenylsulfonium hexafluoroantimonate
4-acetoxy-phenyldiphenylsulfonium tetrafluoroborate
4-acetamidophenyldiphenylsulfonium tetrafluoroborate Of the triaryl-substituted sulfonium complex salts which are suitable for use in the photoresist formulations, the most preferred salt is a mixture of triarylsulfonium hexafluoroantimonate salt, commercially available from Union Carbide Corporation under the trade name CYRACURE UVI-6974.

In another embodiment of the disclosure, the first photoresist formulation also contains the multifunctional epoxy component. A suitable multifunctional epoxy component for making the photoresist formulation according the disclosure, may be selected from aromatic epoxides such as glycidyl ethers of polyphenols. A particularly preferred multifunctional epoxy resin is a polyglycidyl ether of a phenolformaldehyde novolac resin such as a novolac epoxy resin having an epoxide gram equivalent weight ranging from about 190 to about 250 and a viscosity at 130° C. ranging from about 10 to about 60 poise which is available from Resolution Performance Products of Houston, Texas under the trade name EPON RESIN SU-8.

The multi-functional epoxy component of the first photoresist formulation according to the disclosure has a weight average molecular weight of about 3,000 to about 5,000 as determined by gel permeation chromatography, and an average epoxide group functionality of greater than 3, preferably from about 6 to about 10. The amount of multifunctional epoxy resin in the photoresist formulation according preferably ranges from about 30 to about 50 percent by weight based on the weight of the cured layer 60.

The first photoresist formulation described herein may optionally include an effective amount of an adhesion enhancing agent such as a silane compound. Silane compounds that are compatible with the components of the photoresist formulation typically have a functional group capable of reacting with at least one member selected from the group consisting of the multifunctional epoxy compound, the difunctional epoxy compound and the photoinitiator. Such an adhesion enhancing agent may be a silane with an epoxide functional group such as a glycidoxyalkyltrialkoxysilane, e.g., gamma-glycidoxypropyltrimethoxysilane. When used, the adhesion enhancing agent is preferably present in an amount ranging from about 0.5 to about 5 weight percent and preferably from about 0.9 to about 4.5 weight percent based on total weight of the cured resin, including all ranges subsumed therein. Adhesion enhancing agents, as used herein, are defined to mean organic materials soluble in the photoresist composition which assist the film forming and adhesion characteristics of the first photoresist material layer 60 on the surface 62 of the substrate 16.

In order to provide the first photoresist material layer 60 on the surface 62 of the substrate 14 (FIG. 8), a suitable solvent is used. A suitable solvent is a solvent which is preferably non-photoreactive. Non-photoreactive solvents include, but are not limited gamma-butyrolactone, $C_{1-6}$ acetates, tetrahydrofuran, low molecular weight ketones, mixtures thereof and the like. A particularly preferred non-photoreactive solvent is acetophenone. The non-photoreactive solvent is present in the formulation mixtures used to provide the first photoresist material layer 60 in an amount ranging of from about 20 to about 90 weight percent, preferably from about 40 to about 60 weight percent, based on the total weight of the photoresist formulation. The non-photoreactive solvent preferably does not remain in the cured layer 60 and is thus is removed prior to or during the curing steps for layer 60.

According to a preferred procedure, non-photoreactive solvent and difunctional epoxy compound are mixed together in a suitable container such as an amber bottle or flask and the mixture is put in a roller mill overnight at about 60° C. to assure suitable mixing of the components. After mixing the solvent and difunctional epoxy compound, the multifunctional epoxy compound, if used, is added to the container and the resulting mixture is rolled for two hours on a roller mill at about 60° C. The other components, the photoacid generator and the adhesion enhancing agent, are also added one at a time to the container and the container is rolled for about two hours at about 60° C. after adding all of the components to the container to provide a wafer coating mixture.

The photoresist formulations and resulting first photoresist material layer 60 described herein are substantially devoid of acrylate or methacylate polymers and nitrile groups. Without desiring to be bound by theory, it is believed that the higher molecular weight difunctional epoxy material contributes sufficient thermoplastic properties to the layer 60 to enable use of a photocurable formulation that is substantially devoid of acrylate or methacrylate polymers and nitrile rubber components. Additionally, a photoresist formulation, substantially devoid of acrylate or methacrylate polymers, may have an increased shelf life as compared to the same photoresist formulation containing acrylate or methacrylate polymers.

In order to apply the photoresist formulation described above to the surface 62 of the substrate 16 (FIG. 8), a silicon substrate wafer is centered on an appropriate-sized chuck of either a resist spinner or conventional wafer resist deposition track. The first photoresist formulation mixture is either dispensed by hand or mechanically into the center of the wafer. The chuck holding the wafer is then rotated at a predetermined number of revolutions per minute to evenly spread the mixture from the center of the wafer to the edge of the wafer. The rotational speed of the wafer may be adjusted or the viscosity of the coating mixture may be altered to vary the resulting thickness of the layer 60. Rotational speeds of 2500 rpm or more may be used. The amount of photoresist formulation applied to surface 62 of the substrate 16 should be sufficient to provide the layer 60 having the desired thickness for flow features imaged therein. Accordingly, the thickness of layer 60 after curing may range from about 10 to about 25 microns or more.

The resulting silicon substrate wafer containing the layer 60 is then removed from the chuck either manually or mechanically and placed on either a temperature-controlled hotplate or in a temperature-controlled oven at a temperature of about 90° C. for about 30 seconds to about 1 minute until the material is “soft” baked. This step removes at least a portion of the solvent from the layer 60 resulting in a partially dried film on the surface 62 of the substrate 16. The wafer is removed from the heat source and allowed to cool to room temperature.

Prior to imaging and developing the layer 60, the fluid supply via 14 is formed in the substrate 16, such as by an etching process. An exemplary etching process is a dry etch process such as deep reactive ion etching or inductively coupled plasma etching. During the etching process, the layer 60 acts as an etch stop layer.

In order to define flow features in the first photoresist material layer 60 such as a fluid chamber 20 and fluid flow channels 18, the layer 60 is masked with a mask 64 containing substantially transparent areas 66 and substantially opaque areas 68 thereon. Areas of the layer 60 masked by the opaque areas 68 of the mask 64 will be removed upon developing to provide the flow features described above.

Figure 8:
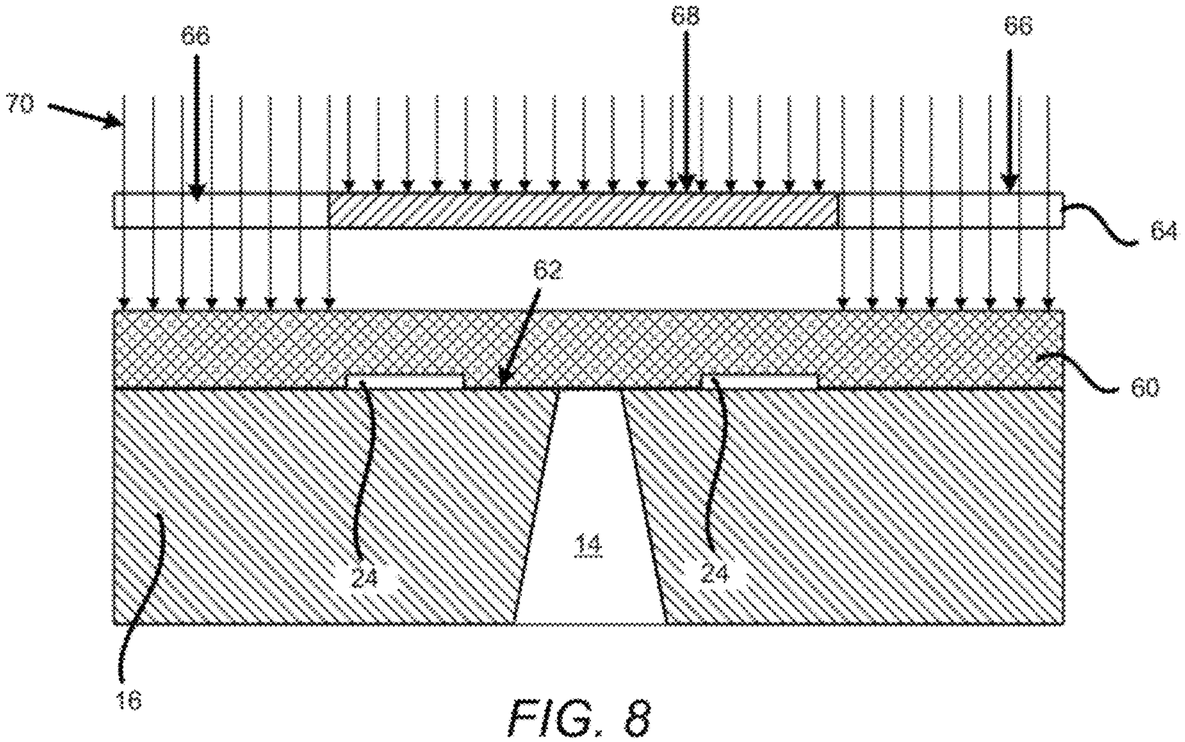
FIGS. 8-12 are cross-section views, not to scale, illustrating steps for making an ejection head according to embodiments of the disclosure.

In FIG. 8, a radiation source provides actinic radiation indicated by arrows 70 to image the layer 60. A suitable source of radiation emits actinic radiation at a wavelength within the ultraviolet and visible spectral regions. Exposure of the layer 60 may be from less than about 1 second to 10 minutes or more, preferably about 5 seconds to about one minute, depending upon the amounts of particular epoxy materials and aromatic complex salts being used in the formulation and depending upon the radiation source, distance from the radiation source, and the thickness of the layer 60. The layer 60 may optionally be exposed to electron beam irradiation instead of ultraviolet radiation.

The foregoing procedure is similar to a standard semiconductor lithographic process. The mask 64 is a clear, flat substrate usually glass or quartz with opaque areas 68 defining the areas to be removed from the layer 60 (i.e., a negative acting photoresist layer). The opaque areas 68 prevent the ultraviolet light from cross-linking the layer 60 masked beneath it. The exposed areas of the layer 60 provided by the substantially transparent areas 66 of the mask 64 are subsequently baked at a temperature of about 90° C. for about 30 seconds to about 10 minutes, preferably from about 1 to about 5 minutes to complete the curing of the layer 60.

Figure 9:
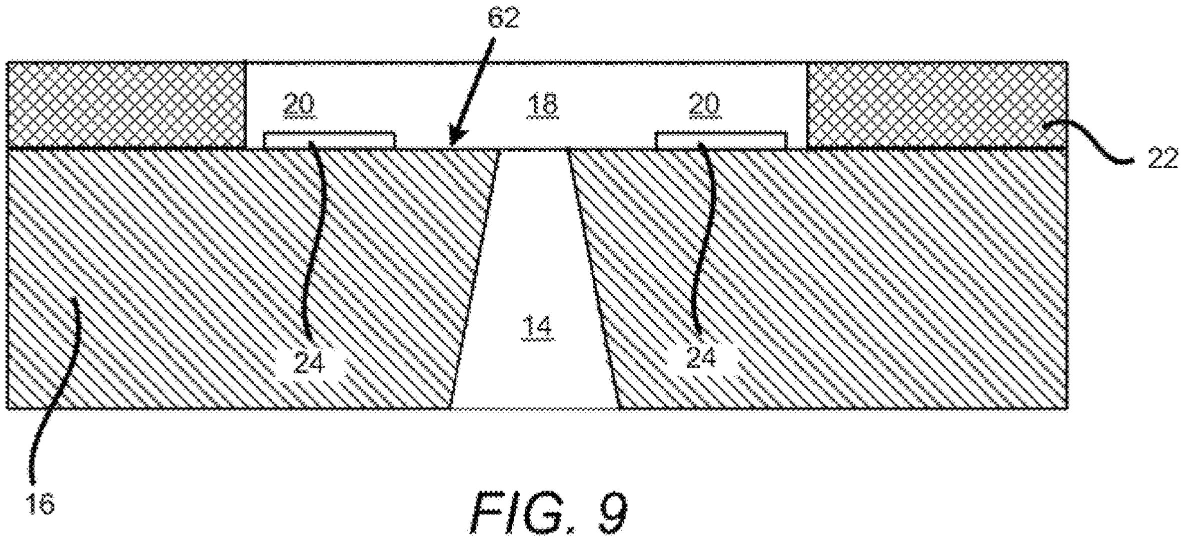

The non-imaged areas of the layer 60 are then solubilized by a developer and the solubilized material is removed leaving the imaged and developed layer 22 on the surface 62 of the substrate 16 as shown in FIG. 9. The developer comes in contact with the substrate 16 and layer 60 through either immersion and agitation in a tank-like setup or by spraying the developer on the substrate 16 and layer 60. Either spray or immersion will adequately remove the non-imaged material. Illustrative developers include, for example, butyl cellosolve acetate, a xylene and butyl cellosolve acetate mixture, and $C_{1-6}$ acetates like butyl acetate.

Exemplary formulations for making the first photoresist material layer 60 are illustrated in the following tables:

TABLE 1

| Component | Amount in cured first layer (wt. %) |
|---|---|
| Difunctional epoxy component (EPON 1007F) | 42.0 |
| 4-phenyl sulfide) phenyl diphenylsulfonium hexafluoroantimonate (CYRACURE 6974) | 15.0 |
| Glycidoxypropyltrimethoxysilane (Z-6040) | 0.93 |
| Acetophenone | 42.07 |

TABLE 2

| Component | Amount in cured first layer (wt. %) |
|---|---|
| Difunctional epoxy component (EPON 1007F) | 20.25 |
| Multifunctional epoxy component (EPON SU-8) | 20.25 |
| Diaryliodoniumhexafluoroantimonate (SARCAT 1012) | 8.9 |
| Glycidoxypropyltrimethoxysilane (Z-6040) | 0.6 |
| Acetophenone | 50.0 |

TABLE 3

| Component | Amount in cured thick film layer (wt. %) |
|---|---|
| Difunctional epoxy component (EPON 1007F) | 44.3 |
| 4-phenyl sulfide) phenyl diphenylsulfonium hexafluoroantimonate (CYRACURE 6974) | 0.9 |
| Glycidoxypropyltrimethoxysilane (Z-6040) | 2.4 |
| Acetophenone | 52.4 |

Figure 10:
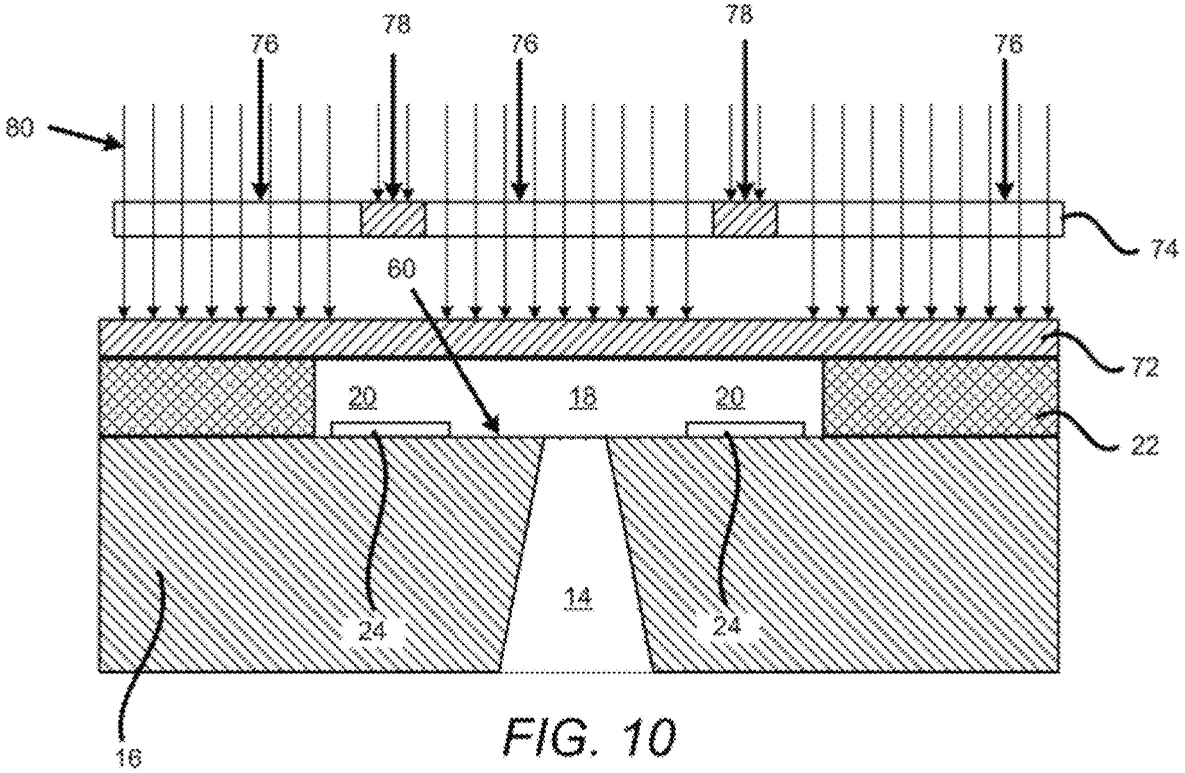

With reference now to FIG. 10, subsequent to imaging and developing the first photoresist material layer 60 to provide the fluid flow layer 22, a second photoresist material layer 72 is laminated to the first layer 22. The second photoresist material layer 72 is provided by a dry film photoresist material derived from a di-functional epoxy compound, a relatively high molecular weight polyhydroxy ether, the photoacid generator described above, and, optionally, the adhesion enhancing agent described above.

The di-functional epoxy compound used for providing the second photoresist material layer 72, includes the first di-functional epoxy compound described above, having a weight average molecular weight typically above 2500 Daltons, e.g., from about 2800 to about 3500 weight average molecular weight in Daltons.

In order to enhance the flexibility of the second photoresist material layer 72 for lamination purposes, a second di-functional epoxy compound may be included in the formulation for the second layer 72. The second di-functional epoxy compound typically has a weight average molecular weight of less than the weight average molecular weight of the first di-functional epoxy compound. In particular, the weight average molecular weight of the second di-functional epoxy compound ranges from about 250 to about 400 Daltons. Substantially equal parts of the first di-functional epoxy compound and the second di-functional epoxy compound are used to make the second photoresist layer 72. A suitable second di-functional epoxy compound may be selected from diglycidyl ethers of bisphenol-A available from DIC Epoxy Company of Japan under the trade name DIC 850-CRP and from Shell Chemical of Houston, Texas under the trade name EPON 828. The total amount of di-functional epoxy compound in the second photoresist material layer 72 ranges from about 40 to about 60 percent by weight based on the total weight of the cured layer 72. Of the total amount of di-functional epoxy compound in the layer 72, about half of the total amount is the first di-functional epoxy compound and about half of the total amount is the second di-functional epoxy compound.

Another component of the second photoresist material layer 72 is a relatively high molecular weight polyhydroxy ether compound of the formula:

$$[OC_6H_4C(CH_3)_2C_6H_4OCH_2CH(OH)CH_2]_n$$

having terminal alpha-glycol groups, wherein n is an integer from about 35 to about 100. Such compounds are made from the same raw materials as epoxy resins, but contain no epoxy groups in the compounds. Such compounds are often referred to as phenoxy resins. Examples of suitable relatively high molecular weight phenoxy resins include, but are not limited to, phenoxy resins available from InChem Corporation of Rock Hill, South Carolina under the trade names PKHP-200 and PKHJ. Such phenoxy compounds have a solids content of about 99 weight percent, a Brookfield viscosity at 25° C. ranging from about 450 to about 800 centipoise, a weight average molecular weight in Daltons ranging from about 50,000 to about 60,000, a specific gravity, fused at 25° C., of about 1.18, and a glass transition temperature of from about 90° to about 95° C.

Phenoxy resins are particularly useful in making the second photoresist layer 72, partially because they often do not crystallize or build up stress concentrations. Phenoxy resins have high temperature characteristics that enable stability over a wide temperature range including temperatures above about 38° C. The second photoresist material layer 72 contains from about 25 to about 35 percent by weight phenoxy resin based on the weight of the cured second layer 72.

As with the photoresist material for the fluid flow layer 22, the second photoresist material layer 72 includes the photoacid generator described above, and, optionally, the adhesion enhancing agent described above. The amount of the photoacid generator ranges from about 15 to about 20 by weight based on the weight of the cured layer 72, and the adhesion enhancing agent, when used, ranges from about 0.05 to about 1 percent by weight based on the weight of the cured second layer 72.

The second photoresist material layer 72 is applied as a dry film laminate to the fluid flow layer 22 after curing and developing layer 22. Accordingly, the foregoing components of the second photoresist material layer 72 may be dissolved in a suitable solvent or mixture of solvents and dried on a release liner or other suitable support material. A solvent in which all of the components of the second photoresist material layer 72 are soluble is an aliphatic ketone solvent or mixture of solvents. A particularly useful aliphatic ketone solvent is cyclohexanone. Cyclohexanone may be used alone or preferably in combination with acetone. Cyclohexanone is used as the primary solvent for the second layer composition due to the solubility of the high molecular weight phenoxy resin in cyclohexanone. Acetone is optionally used as a solvent to aid the film formation process. Since acetone is highly volatile solvent it eludes off quickly after the film has been drawn down onto a release liner or support material. Volatilization of the acetone helps solidify the liquid resin into a dry film for layer 72.

Figure 11:
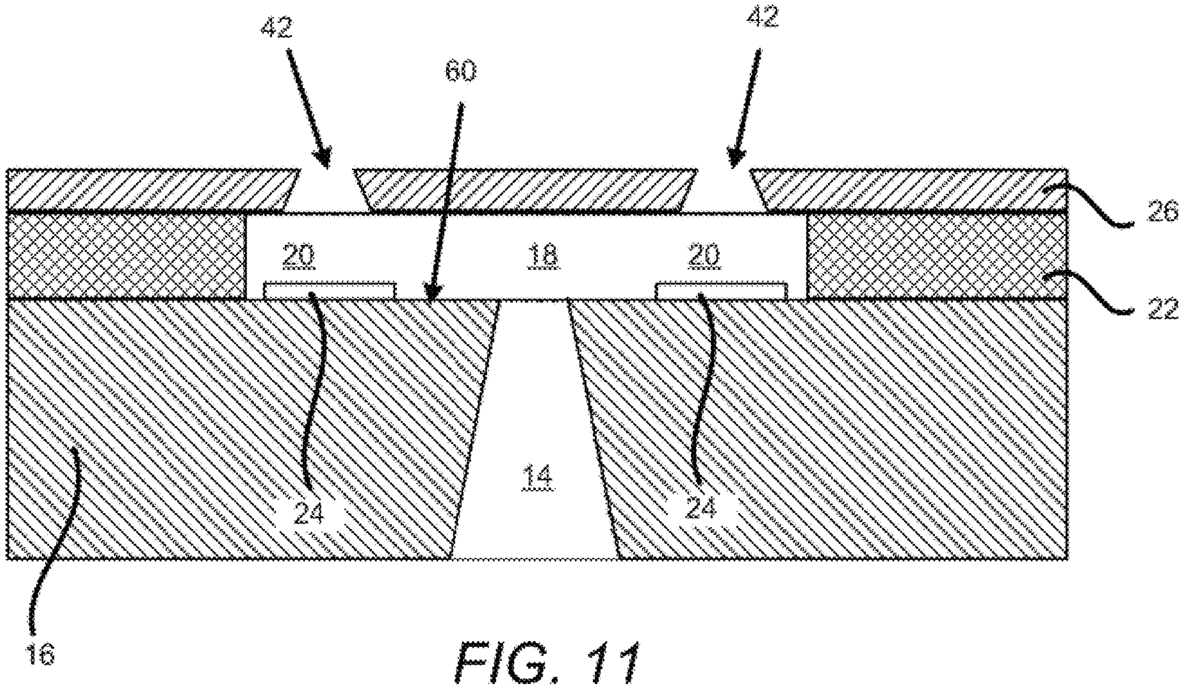

With reference to FIGS. 10 and 11, a method for making an ejection head containing the second photoresist material layer 72 will now be described. According to the method, the second photoresist material layer 72 is imaged and developed according to the procedure used for the first photoresist material layer 60. The second photoresist material layer 72 may be laminated to the fluid flow layer 22 using heat and pressure. Next a mask 74 is used to define the nozzle holes 42 in the second photoresist layer 72. As described above, the mask 74 includes transparent areas 76 and opaque areas 78 defining the nozzle holes 42 in the second layer 72. The opaque areas 78 prevent actinic radiation indicated by arrow 80 from contacting the second layer 72 in an area which will provide the nozzle holes 42, while the remainder of the second layer 72 is cured by the actinic radiation. Upon developing the second photoresist material layer 72 with a suitable solvent as described above, the nozzle holes 42 are formed in the nozzle plate 26 as shown in FIG. 11. Conventional photoimaging and developing techniques as described above are used to image and develop the second photoresist material layer 72.

After developing the second photoresist material layer 72, the substrate 16 containing the fluid flow layer 22 and nozzle plate 26 is optionally baked at temperature ranging from about 150° C. to about 200° C., preferably from about from about 170° C. to about 190° C. for about 1 minute to about 60 minutes, preferably from about 15 to about 30 minutes to prevent damage or warping of the nozzle plate 26 during subsequent formation of the fluid channels 46, described above. The glass transition temperature of the nozzle plate 26 is about 175° C. which is above a dry film lamination temperature used to apply a third photoresist material layer 82 to the nozzle plate 26.

Figure 12:
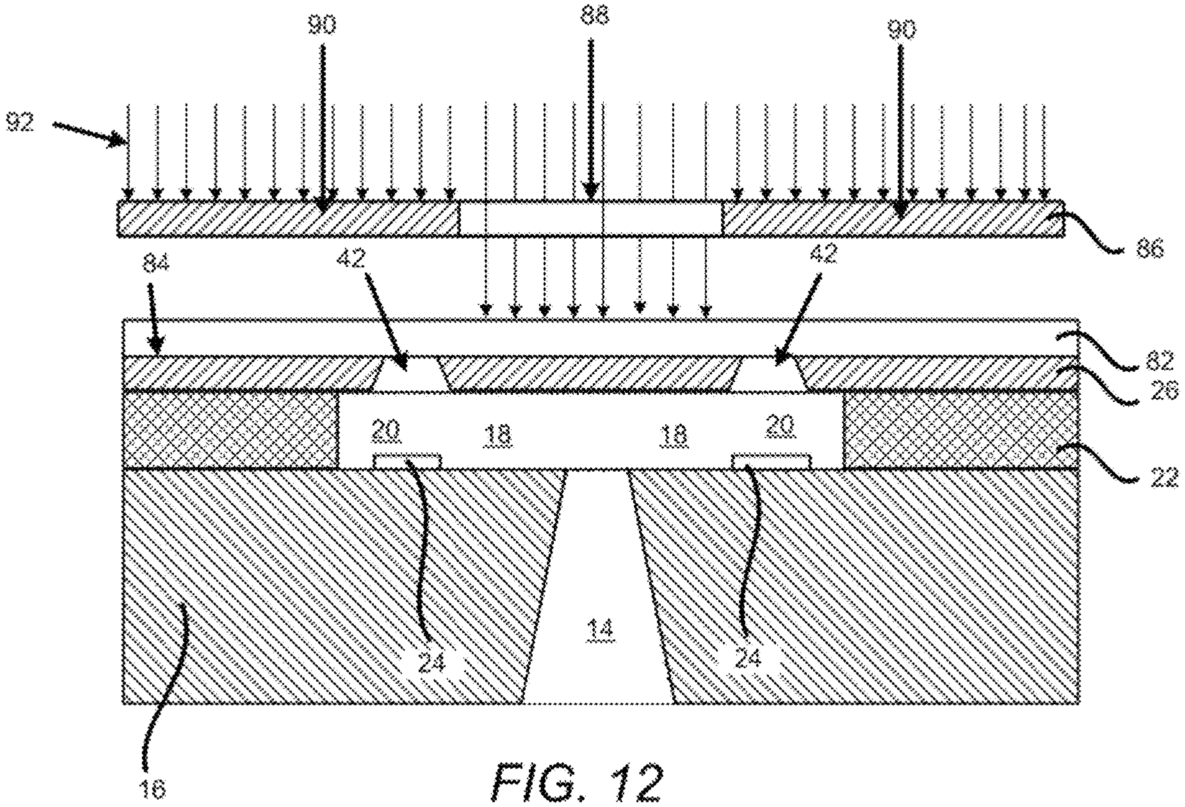

With reference now to FIG. 12, a method for making the channels 46 and/or troughs 50/52 in the third layer 82 is described. Subsequent to imaging and developing and, optionally, baking the nozzle plate 26, the third photoresist material layer 82 is laminated to the exterior surface 84 of the nozzle plate 26 as shown in FIG. 12. The third photoresist material layer 82 is provided by a dry film photoresist material of the same formulation described above with respect to the nozzle plate 26. Accordingly, the third layer 82 is also derived from a di-functional epoxy compound, a relatively high molecular weight polyhydroxy ether, the photoacid generator described above, and, optionally, the adhesion enhancing agent described above.

A suitable formulation for providing the second and third photoresist material layers 72 and 82 is as follows:

TABLE 4

| Component | Amount in photoresist formulation (wt. %) |
|---|---|
| First di-functional epoxy component (EPON 1007F) | 9.6 |
| Second di-functional epoxy component (DIC 850 CRP) | 9.6 |
| Polyhydroxy ether (InChem PKHJ) | 12.8 |
| Diaryliodoniumhexafluoroantimonate (SARCAT 1012) | 7.2 |
| Glycidoxypropyltrimethoxysilane (Z-6040) | 0.3 |
| Cyclohexanone | 50 |
| Acetone | 10.5 |

The third photoresist material layer 82 is applied as a dry film laminate to the exterior surface 84 of the second photoresist layer 72 after curing and developing and, optionally, baking the second layer 72. Accordingly, the foregoing components of the third photoresist material layer 82 may also be dissolved in a suitable solvent or mixture of solvents and dried on a release liner or other suitable support material. A solvent in which all of the components of the second photoresist material layer 82 are soluble is an aliphatic ketone solvent or mixture of solvents. A particularly useful aliphatic ketone solvent is cyclohexanone. Cyclohexanone may be used alone or preferably in combination with acetone. Cyclohexanone is used as the primary solvent for the second layer composition due to the solubility of the high molecular weight phenoxy resin in cyclohexanone. Acetone is optionally used as a solvent to aid the film formation process. Since acetone is highly volatile solvent it eludes off quickly after the film has been drawn down onto a release liner or support material. Volatilization of the acetone helps solidify the liquid resin into a dry film for layer 82.

As described above, the third photoresist material layer 82 may be laminated to the exterior surface 84 of the nozzle plate 26 using heat and pressure at a temperature that is below the glass transition temperature of the nozzle plate 26. Next a mask 86 is used to define the channels 46 and troughs 50/52 in the third layer 82. The mask 86 includes transparent areas 88 and opaque areas 90 defining the channels 46 and troughs 50/52 in the third layer 82. Opaque areas 90 prevent actinic radiation indicated by arrow 92 from contacting the third layer 82 in an area of the layer 82 to be removed, while the transparent areas 88 of the mask 86 enable the actinic radiation to cure the areas of the third layer 82 that will remain on the nozzle plate layer 26. Upon developing the third photoresist material layer 82 with a suitable solvent as described above, the channels 46 and troughs 50/52 are formed in layer 82 FIGS. 3-4. Conventional photoimaging and developing techniques as described above are used to image and develop the third photoresist material layer 48.

After developing the third photoresist material layer 82, the substrate 16 containing the layer 22, the nozzle plate 26, and the layer 82 is optionally baked at temperature ranging from about 150° C. to about 200° C., preferably from about from about 170° C. to about 190° C. for about 1 minute to about 60 minutes, preferably from about 15 to about 30 minutes. A cross sectional view of an ejection head containing the channels 46 and troughs 50/52 is illustrated in FIG. 3.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A nozzle plate of a fluid ejection head for a fluid ejection device, the nozzle plate comprising nozzle holes and a fluid channel layer attached to an exposed surface of the nozzle plate, wherein the fluid channel layer comprises a single rectangular fluid channel formed in the fluid channel layer for each of the nozzle holes and wherein the single rectangular fluid channel is configured to urge fluid in a lateral direction away from each of the nozzle holes through the rectangular fluid channel toward a non-functional area of the nozzle plate in the absence of a wiper or other maintenance device.

2. The nozzle plate of claim 1, wherein the nozzle plate comprises a photoimageable layer.

3. The nozzle plate of claim 1, wherein the fluid channel layer further comprises a single recessed area circumscribing each of the nozzle holes in fluid flow communication with the single rectangular fluid channel.

4. The nozzle plate of claim 3, wherein the single recessed area comprises a rectangular recessed area.

5. The nozzle plate of claim 1, wherein each single rectangular fluid channel has a size that promotes capillary action to urge fluid away from each of the nozzle holes in the lateral direction toward the non-functional area of the nozzle plate.

6. A fluid ejection head configured for an industrial printer devoid of a maintenance station comprising the nozzle plate of claim 1.

7. A method for making an improved fluid ejection head for fluid ejection device, the method comprising the steps of:

applying a first negative photoresist layer to a device surface of a semiconductor substrate, wherein the first negative photoresist layer is derived from a composition comprising a multi-functional epoxy compound, a first di-functional epoxy compound, a photoacid generator, an adhesion enhancer, and an aryl ketone solvent;

imaging and developing the first negative photoresist layer to provide a plurality of flow features therein;

applying a second negative photoresist layer to an exposed surface of the first photoresist layer; the second negative photoresist layer having a thickness ranging from about 10 to about 30 microns and being derived from a second photoresist formulation comprising a second di-functional epoxy compound, a relatively high molecular weight polyhydroxy ether, the photoacid generator, the adhesion enhancer, and an aliphatic ketone solvent;

imaging and developing the second photoresist layer to provide a nozzle plate having nozzle holes therein;

applying a third negative photoresist layer to an exposed surface of the nozzle plate; and imaging and developing the third negative photoresist layer to provide a single rectangular fluid channel therein for each of the nozzle holes wherein the single rectangular fluid channel is configured to urge fluid in a lateral direction away from each of the nozzle holes through the single rectangular fluid channel toward a non-functional area of the nozzle plate in the absence of a wiper or other maintenance device.

8. The method of claim 7, wherein the nozzle plate comprises a photoimageable layer.

9. The method of claim 7, further comprising imaging and developing the third photoresist layer to provide a single recessed area in the third photoresist layer circumscribing each of the nozzle holes in fluid flow communication with the single rectangular fluid channel.

10. The method of claim 9, wherein the single recessed area comprises a rectangular recessed area.

11. The method of claim 7, wherein each single rectangular fluid channel has a size that promotes capillary action to urge fluid away from each of the nozzle holes in the lateral direction toward the non-functional area of the nozzle plate.

* * * * *